Feb. 22, 1944.  A. M. S. WILL  2,342,441
HYDROMETRIC APPARATUS
Filed May 5, 1941  2 Sheets-Sheet 1

INVENTOR
Alexander Mitchell Smith Will
BY Hoguet, Neary & Campbell
ATTORNEY

Feb. 22, 1944. A. M. S. WILL 2,342,441
HYDROMETRIC APPARATUS
Filed May 5, 1941 2 Sheets-Sheet 2
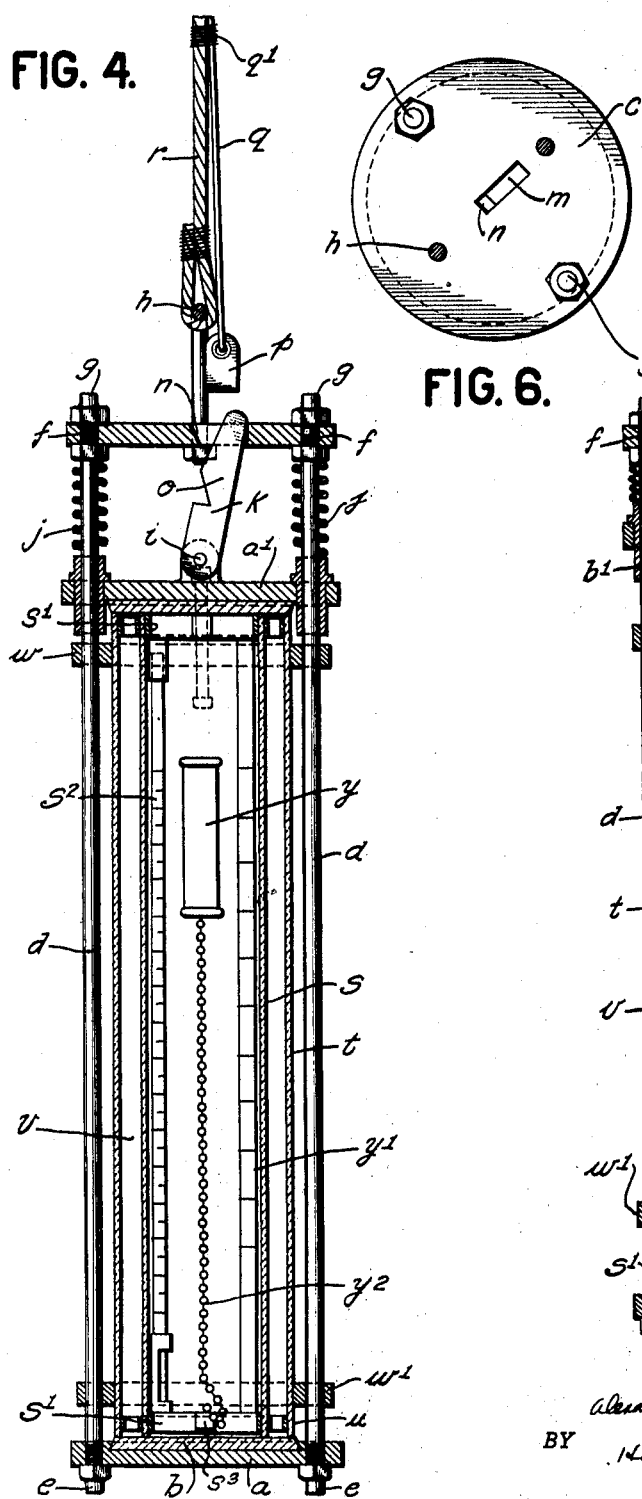
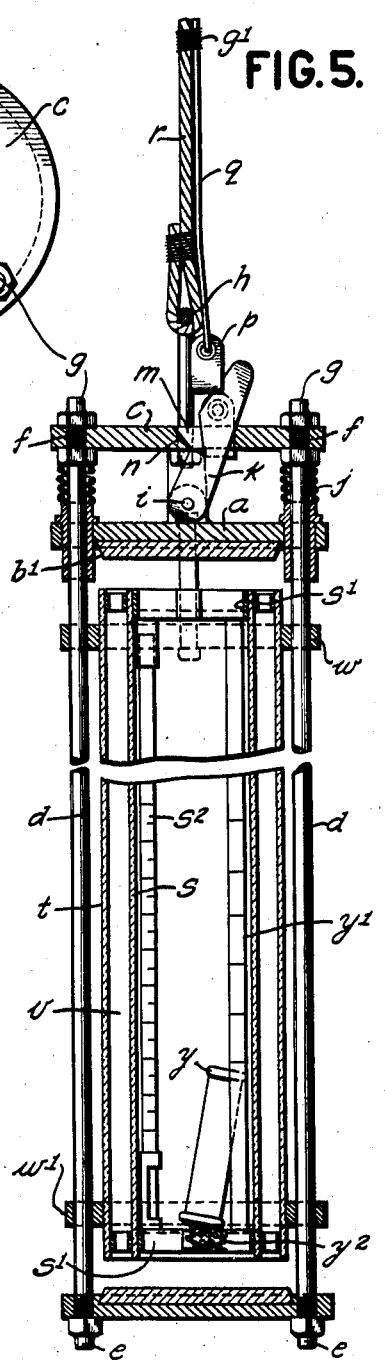
INVENTOR
Alexander Mitchell Smith Will
BY Hoguet, George Campbell
ATTORNEY Patented Feb. 22, 1944

2,342,441

UNITED STATES PATENT OFFICE 2,342,441

HYDROMETRIC APPARATUS

Alexander Mitchell Smith Will, Buckhurst Hill, England, assignor of one-third to Arthur Joseph Hughes, Chigwell Row, Essex, England, and one-third to Henry Hughes & Son Limited, London, England, a British limited-liability company Application May 5, 1941, Serial No. 392,020
In Great Britain May 30, 1940

7 Claims. (Cl. 265—46)

This invention relates to improvements in hydrometric apparatus for transparent liquid in bulk.

For the purpose of calculating the weight of liquid contained in a tank it is necessary to ascertain the specific gravity of the liquid in different places in the tank and simultaneously to ascertain the temperature of each location in order that the average density can be computed.

When dealing with volatile hydrocarbons in the tropics, for example benzol stored in a tank at a temperature of say 65° F. with an atmospheric temperature of say 135° F., there is considerable difficulty in ascertaining the specific gravity duly corrected for temperature in the tank owing to the high atmospheric temperature.

This invention has for its object to enable the average density of transparent volatile liquids in bulk to be ascertained without decantation more easily and with greater accuracy than has been possible hitherto.

This invention consists in improved hydrometric apparatus for transparent liquid in bulk comprising a transparent chamber containing a hydrometer and a thermometer, a jacket with a transparent wall embracing said chamber, valves at the upper and lower ends of said chamber and jacket to allow liquid to enter into, flow through, be retained in and escape from said chamber and jacket at will, means for lowering and raising said chamber and its adjuncts into and from the liquid and means for operating said valves whilst the apparatus is immersed, to retain in the chamber and the jacket the liquid collected at the depth of immersion.

The invention can be carried into practice by a variety of constructions which depend upon the nature of the liquid to be examined and the conditions under which the examination is conducted and therefore the construction shown in the drawings is given by way of example only.

In the drawings:

Figure 4 is a vertical sectional elevation of Figure 1 taken on the line 4—5 of Figure 3;

Figure 5 is a vertical sectional elevation of Figure 2 taken on the line 4—5 of Figure 3; and Figure 6 is a detail plan view of the upper plate used in the construction shown in the preceding figures.

Figures 1, 2, 3:
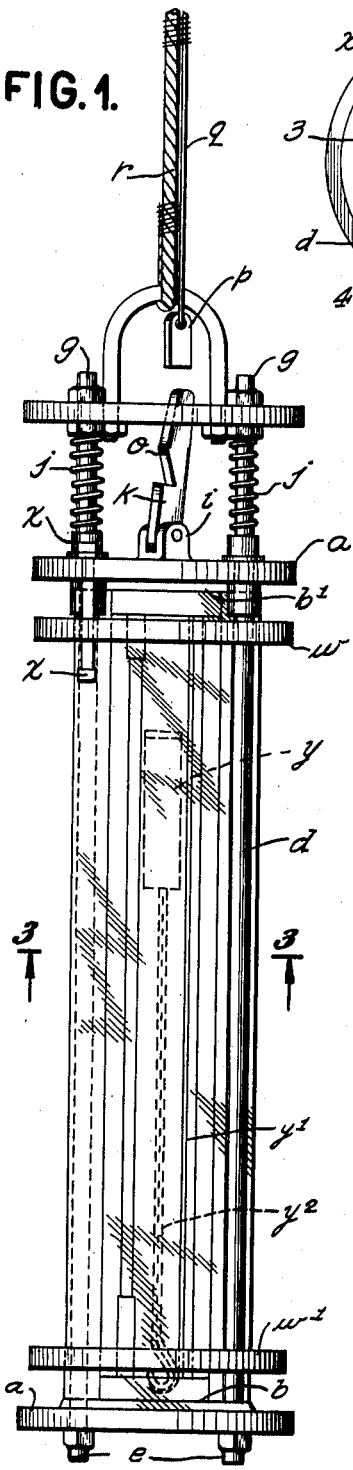
Figure 1 is a vertical elevation of one form of improved hydrometer after immersion and ready for a reading to be taken.
Figure 2 is a vertical elevation (somewhat similar to Figure 1) but showing the arrangement ready for immersion.
Figure 3 is an inverted plan view in section taken on the line 3—3 of Figure 1 and looking in the direction of the arrows.

In the construction shown in the drawings the improved apparatus consists of a frame having a lower platen $a$ with an upwardly facing pad $b$ of resilient material (such for example as synthetic rubber) an upper plate $c$ and two vertical guide bars $dd$ which are screwed into the platen $a$ at their lower ends and locked in place by the nuts $ee$ whilst the upper ends pass through holes $ff$ in the plate $c$ and are secured in position by the nut $gggg$.

The upper plate $c$ is provided with a supporting shackle $h$ and forms part of a latching means to be described hereinafter.

An upper platen $a^1$ with a downwardly facing pad $b^1$ of resilient material similar to that of the pad $b$, is slidingly mounted on the guide bars $dd$ and is urged to descend thereon by the springs $jj$.

The upper platen $a^1$ has a latch element or trigger $k$ pivoted thereon at $i$, said trigger $k$ passing through a slot $m$ in the plate $c$ (see Figure 6).

The slot $m$ has an inclined surface $n$ at one end and the trigger $k$ has a notch with an inclined surface $o$ shaped to cooperate with $n$, a block or cotter $p$ being provided to retain the trigger $k$ in cooperation with the upper plate $c$ when required.

The cotter $p$ is attached to one end of a length of thin cord $q$, which is associated with the supporting rope $r$ by means of several bights or ties $q^1$ (one of which only is shown in the drawings) that permit the cord $q$ to slide relatively to the rope $r$, the rope $r$ and cord $q$ both being in the hands of the operator who is thus able to lower the device as a whole to the desired depth and then withdraw the cotter $p$ when required.

The container for the sample of the liquid, the specific gravity of which is to be ascertained, is formed of a glass tube $s$ arranged within another glass tube $t$, said tubes $s$ and $t$ being connected together and spaced apart by ported rings $u$ to form a jacket $v$.

The ports in the rings $u$ admit liquid into said jacket $v$ which is of such radial width as to form a thermal insulating sleeve protecting the liquid collected at the same time and temperature in the tube $s$, forming the hydrometer chamber, from the effect of atmospheric temperature even when very high, say 135° F., for a period of time which is considerably greater than that needed for the taking of a reading. If the diameter of the hydrometer chamber is about 45 or 50 millimeters, the radial width of the jacket may be about 6 or 8 millimeters.

The ends of the glass tubes $s$ and $t$ constitute valve seatings arranged to cooperate with the pads $b$ and $b^1$ as and when desired and the upper and lower ends of the tube $t$ have flanges $w$ and $w^1$ respectively, cemented externally thereon and disposed so as to slide freely on the guide bars $dd$ during operation, the upper flange $w$ being engaged with lost motion by the stops $xx$ of the links mounted in the upper platen $a^1$ so that, when open, the lower ends of the tubes $s$ and $t$ are raised from off the pad $b$.

The inside of the tube $s$ is provided with rings $s^1s^1$ which support a thermometer $s^2$ and the scale $y^1$ for a hydrometric float $y$. A length of chain $y^2$ is secured at one end to the float $y$ and at its other end to the cross bar $s^3$ which prevents inadvertent removal of the float $y$. The cross bar $s^3$ is secured to the lower ring $s^1$.

The float $y$ may be made of suitably resistant glass or constructed of an appropriate metal such as silver and the chain $y^2$ is carefully made so that the weight per unit of length is constant throughout and from such a metal as silver so as to avoid the necessity of cleaning the apparatus frequently or at all. The length of the chain $y^2$ exceeds the greatest possible travel of the float $y$ so that there is always some slack in the lower end of the chain $y^2$ and the quantity of chain raised by the float $y$ depends entirely on the specific gravity of the liquid.

In use the upper platen $a^1$ is raised against the pressure of the springs $jj$ and in turn raises the tubes $s$ and $t$ so that free passage is provided for fluid between the ends of $s$ and $t$ and the pads $b$ and $b^1$ respectively.

In this position the inclined surface $o$ of the trigger $k$ will be opposite the inclined surface $n$ so that the trigger $k$ can be moved to the left (see Figure 5) to provide a space into which the cotter $p$ can be inserted.

The apparatus as a whole is now lowered into the tank of liquid and the liquid will flow through the tube $s$ and the jacket $v$ during the descent; after a short pause, on reaching the desired depth, to equalise the temperature of the apparatus as a whole to that of the liquid, the supporting cord $q$ is jerked upwardly to withdraw the cotter $p$, thus allowing the springs $jj$ to operate and bring the pads $b$ and $b^1$ firmly into contact with the ends of the tubes $s$ and $t$ thus retaining the liquid in the tube $s$ and jacket $v$.

When the apparatus is raised the temperature of the liquid can be read off from the thermometer $s^2$ and the specific gravity from the scale $y^1$ and noted, after which the upper platen $a^1$ is again raised to empty the tube $s$ and jacket $v$ when the apparatus is ready for another reading.

So that my improved hydrometric apparatus may be of dimensions convenient to handle, it is found to be advisable to limit the specific gravity range of each device and to use floats of different weights to cover an extended working range.

I claim:

1. In an improved hydrometric apparatus for transparent liquid in bulk, the combination of a first open ended transparent hollow member, a second open ended transparent hollow member within and spaced from said first open ended hollow member, a hydrometer and scale in said second member, means for suspending said members in said liquid to permit liquid to flow into said members, and valve means for sealing the open ends of said members.

2. Improved hydrometric apparatus for transparent liquid in bulk having in combination a tubular transparent member forming a chamber open at both ends, a hydrometer and scale in said chamber, a thermometer and scale in said chamber, an open-ended transparent tubular member encircling said chamber to form a jacket, valves at the opposite ends of said chamber and said jacket, means for lowering and raising said apparatus into and from said liquid and means for operating said valves to seal the open ends of said chamber and said jacket to retain in said chamber and said jacket the liquid collected at a specified depth.

3. Improved hydrometric apparatus for transparent liquid in bulk having in combination a tube of transparent material, a thermometer with scale in said tube, a hydrometer with scale in said tube, a second tube of transparent material concentric with said first named tube to form a tubular jacket with open ends, valves at the upper and lower ends of said tubes to allow liquid to enter into, flow through, be retained in and escape from said tubes at will, means for lowering and raising said apparatus into and from the bulk of liquid and means for operating said valves when lowered to force them against the ends of said first and second tubes to seal said tubes one from the other and retain in the tubes the liquid collected at a specified depth.

4. Improved hydrometric apparatus for transparent liquid in bulk having in combination a tube of transparent material, a thermometer with scale in said tube, a hydrometer with scale in said tube, a second tube of transparent material arranged coaxially with said first named tube to form a tubular jacket with open ends, a lower platen with a resilient pad adjacent the lower ends of said tubes, an upper plate, a shackle on said upper plate, a supporting rope in said shackle, guide bars connecting said lower platen to said upper plate and supporting said tubes, an upper platen sliding on said guide bars and having a resilient pad adjacent the upper ends of said tubes, springs urging the said platens to force the said pads into closure cooperation with the ends of the tubes, means for latching the platens and pads away from the ends of the tubes, and means for releasing the platens to retain in the tubes the liquid collected at a specified depth.

5. Improved hydrometric apparatus for transparent liquid in bulk having in combination a tube of transparent material, a hydrometer with scale in said tube, a thermometer with scale in said tube, a second tube of transparent material, spacing means secured to the exterior of the first named tube and the interior of the second named tube, a lower platen with resilient pad adjacent the lower ends of said tubes, an upper plate, a shackle on said upper plate, a supporting rope in said shackle, guide bars connecting said lower platen to said upper plate, flanges on the exterior of the second named tube sliding on said guide bars, an upper platen sliding on said guide bars and having a resilient pad adjacent the upper ends of said tubes, springs urging said platens to force said pads into closure cooperation with the ends of the tubes, coupling means between said upper platen and said flanges to raise the lower ends of the tubes from off the lower platen when the upper platen has been raised from off the upper ends of the tubes, means for latching the platens and pads away from the ends of the tubes and means for releasing the platens to retain in the tubes the liquid collected at a specified depth.

6. Improved hydrometric apparatus for transparent liquid in bulk having in combination a tube of transparent material, a sealed float in said tube, a chain of constant weight per unit of length attached to said float, a scale of height for the float in said tube, a scaled thermometer in said tube, a second tube of transparent material, spacing means secured to the exterior of the first named tube and the interior of the second named tube to form an open ended jacket between the tubes, a lower platen with resilient pad adjacent the lower ends of said tubes, a slotted upper plate, a shackle on said upper plate, a supporting rope in said shackle, guide bars connecting said lower platen to said upper plate, flanges on the exterior of the second named tube sliding on said guide bars, an upper platen sliding on said guide bars and having a resilient pad adjacent the upper ends of said tubes, springs urging said platens to force said pads into closure cooperation with the ends of the tubes, links passing through said upper platen and said flanges, stops on said links to raise the lower ends of the tubes from off the lower platen, a notched trigger pivoted on said upper platen and passing through said slot, a cotter for holding the end of said slot in the notch in said trigger, a releasing cord connected to said cotter and a plurality of bights or ties for associating said cord with said rope without restriction of relative movement.

7. Improved hydrometric apparatus for transparent liquid in bulk having in combination a tube of transparent material, a sealed float in said tube, a chain of constant weight per unit of length attached to said float, a scale of height for the float in said tube, a scaled thermometer in said chamber, a second tube of transparent material, spacing means secured to the exterior of the first named tube and the interior of the second named tube to form an open ended jacket between the tubes, a lower platen with resilient pad adjacent the lower ends of said tubes, a slotted upper plate with an upwardly inclined surface at one end of the slot, a shackle on said upper plate, a supporting rope in said shackle, guide bars connecting said lower platen to said upper plate, flanges on the exterior of the second named tube sliding on said guide bars, an upper platen sliding on said guide bars and having a resilient pad adjacent the upper ends of said tubes, springs urging said platens to force said pads into closure cooperation with the ends of the tubes, links passing through said upper platen and said flanges, stops on said links to raise the lower ends of the tubes from off the lower platen, a notched trigger pivoted on said upper platen, passing through said slot and having an inclined surface to cooperate with the inclined surface at one end of the slot for automatic disengagement, a cotter for holding the end of said slot in the notch in said trigger, a releasing cord connected to said cotter and a plurality of bights or ties for associating said cord with said rope without restriction of relative movement.

ALEXANDER MITCHELL SMITH WILL.